(12) United States Patent
Evans et al.

(10) Patent No.: US 11,976,236 B2
(45) Date of Patent: May 7, 2024

(54) METHODS AND COMPOSITIONS FOR ENHANCING INTEGRITY AND THERMAL CONDUCTIVITY OF WELLBORES IN GEOTHERMAL OPERATIONS (71) Applicant: Halliburton Energy Services, Inc., Houston, TX (US)

(72) Inventors: Brian Alan Evans, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/584,615

(22) Filed: Jan. 26, 2022

(65) Prior Publication Data

US 2023/0235208 A1   Jul. 27, 2023

(51) Int. Cl.
*C09K 8/05* (2006.01)
*C09K 23/38* (2022.01)
*C09K 23/54* (2022.01)

(52) U.S. Cl.
CPC ............... *C09K 8/05* (2013.01); *C09K 23/38* (2022.01); *C09K 23/54* (2022.01)

(58) Field of Classification Search
CPC ........... C09K 8/05; C09K 23/38; C09K 23/54
See application file for complete search history.

(56) References Cited

U.S. PATENT DOCUMENTS

| | | | |
|---|---|---|---|
| 3,461,980 A * | 8/1969 | Kelly, Jr. | ................ C09K 8/06 175/70 |
| 4,030,549 A | 6/1977 | Bouck | |
| 4,662,440 A | 5/1987 | Harmon et al. | |
| 6,095,244 A * | 8/2000 | Graham | ................ E21B 43/17 166/272.2 |
| 6,702,021 B1 * | 3/2004 | Nguyen | ................ C09K 8/24 507/216 |
| 7,073,581 B2 | 7/2006 | Nguyen et al. | |
| 8,430,166 B2 | 4/2013 | Danko | |
| 8,931,553 B2 | 1/2015 | Cannan et al. | |
| 9,394,774 B2 * | 7/2016 | Soliman | ................ E21B 43/26 |
| 9,541,309 B2 | 1/2017 | Colwell | |
| 9,726,157 B2 | 8/2017 | Sweatman et al. | |
| 9,892,994 B2 | 2/2018 | Scurati et al. | |
| 10,236,198 B2 | 3/2019 | Wu et al. | |
| 10,551,091 B2 | 2/2020 | Krüger | |
| 10,927,604 B2 | 2/2021 | Danko | |
| 2008/0185184 A1 * | 8/2008 | Maguire | ................ E21B 19/22 175/17 |
| 2010/0288466 A1 | 11/2010 | Danko | |
| 2010/0307756 A1 | 12/2010 | Jung et al. | |
| 2012/0199354 A1 | 8/2012 | Kaminsky | |
| 2020/0011151 A1 | 1/2020 | Toews et al. | |
| 2020/0049380 A1 | 2/2020 | Cairns et al. | |
| 2023/0040360 A1 * | 2/2023 | Li | ................ C09K 8/805 |

FOREIGN PATENT DOCUMENTS

| | | |
|---|---|---|
| CA | 3044191 A1 | 7/2018 |
| CA | 3044153 C | 9/2020 |
| CN | 109577930 A | 4/2019 |
| CN | 210370605 U | 4/2020 |
| WO | 2012/073851 A1 | 6/2012 |
| WO | 2019/059032 A1 | 3/2019 |

* cited by examiner

*Primary Examiner* — Kumar R Bhushan
(74) *Attorney, Agent, or Firm* — Conley Rose, P.C.; Rodney B. Carroll (57) ABSTRACT Methods and compositions for enhancing wellbores and propped fractures for use in geothermal operations are provided. In some embodiments, the methods comprise: drilling with a drilling composition at least a portion of a first wellbore, wherein the drilling composition comprises a base fluid, a resin, and a thermally conductive filler; introducing a fracturing fluid into the first wellbore at a first pressure sufficient to create at least a first set of fractures extending from and in fluid communication with the first wellbore; and introducing a first plurality of proppant particulates into at least the first set of fractures, wherein a second wellbore penetrates at least a second portion of the subterranean formation, and wherein a second set of fractures extends from and is in fluid communication with the second wellbore into the subterranean formation, and the first set of fractures is in fluid communication with the second set of fractures.

20 Claims, 3 Drawing Sheets

METHODS AND COMPOSITIONS FOR ENHANCING INTEGRITY AND THERMAL CONDUCTIVITY OF WELLBORES IN GEOTHERMAL OPERATIONS

BACKGROUND

The present disclosure relates to systems and methods for enhancing wellbores and/or propped fractures for use in geothermal operations.

The high temperatures of oil well formations allow some post-extraction wells to be converted to produce geothermal energy. Geothermally converted wells operate by transferring fluid into a wellbore, allowing it to become heated by the formation, and extracting the fluid. The high-temperature fluid may then be used for electricity generation, evaporation, heat exchange, or to circulate heat to one or more nearby buildings.

Despite the economical and energy benefits of converting oil and gas wells to geothermal operations, the harsh downhole temperature and pressure conditions present can cause the formation surrounding a wellbore and the propped fractures therein to deteriorate. High fluid flow rates and stress cycling associated with degradation can result in damage to the formation, the propped fractures, and the wellbore. Accordingly, fluid flow paths can become restricted, thereby impeding a converted well's geothermal efficiency. Degradation of propped fractures, migration of proppant from propped fractures, and production flowback can severely decrease the fractures' thermal conductivity. As degradation persists, solids production can damage equipment or cause further wellbore restriction. If left unchecked, the heat and pressure of post-extraction oil wells can greatly diminish the thermal conductivity and integrity of wellbores, formations, and fractures, thereby decreasing geothermal efficiency and creating a danger to oil well equipment.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only and are not exhaustive of the scope of the disclosure.

DESCRIPTION OF CERTAIN EMBODIMENTS

The present disclosure relates to systems and methods for enhancing wellbores and/or propped fractures for use in geothermal operations. More particularly, the present disclosure relates to methods and compositions for constructing wellbore systems that can be used to more efficiently extract geothermal energy from a wellbore.

The present disclosure provides methods for increasing the conductivity and strength of an oil well formation and the fractures therein by drilling injection and/or production wellbores with a drilling fluid that includes a thermally conductive resin composition comprising a thermally conductive filler and a resin. In some embodiments, the resin composition may be allowed to penetrate portions of the walls of the wellbore(s) and/or the surrounding areas of the subterranean formation. In some embodiments, a plurality of propped fractures may be generated in the subterranean formation that communicate with each wellbore. In some embodiments, one or more of the primary fractures (i.e., one or more fractures that directly communicates with and/or originates at the wellbore) extending from one wellbore may be located between at least two primary fractures formed from the other wellbore. In some embodiments, the proppant placed in the fractures may be coated with a thermally conductive resin composition. Once exposed to heat within the subterranean formation, the resin composition may undergo a polymerization reaction, which may, inter alia, transform the proppant in the propped fractures into consolidated, thermally conductive, permeable proppant packs. These thermally conductive proppant packs hold the fractures in place with high strength while allowing fluid to pass through.

Among the many potential advantages to the methods and compositions of the present disclosure, only some of which are alluded to herein, the methods and compositions of the present disclosure may increase the conductivity of geothermally converted well systems, thereby increasing their efficiency. Also, the methods and compositions disclosed herein may help to decrease the risk of equipment damage by strengthening geothermally converted well systems, mitigating degradation, and decreasing the risk of solids production. Moreover, the increased formation strength provided by the present disclosure may enhance the longevity of geothermal operations. Additionally, the methods and compositions disclosed herein may be practiced with low-cost resin systems. Further, the thermally induced self-curing mechanism of the present disclosure's resin compositions may alleviate the need for an acid postflush fluid in some cases.

In certain methods of the present disclosure, a base fluid may be provided as a component of, for example, a drilling composition, fracturing fluid, and/or a working fluid. The base fluid used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid may be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, one or more treatment fluids may comprise a mixture of one or more fluids and/or gases, including but not limited to emulsions, foams, and the like.

In certain embodiments, the drilling compositions, fracturing fluids, working fluids, or other treatment fluids used in the methods and compositions of the present disclosure optionally may comprise any number of additional additives. Examples of such additional additives include, but are not limited to, salts, surfactants, acids, spacers, diverting agents, fluid loss control additives, gas, nitrogen, carbon dioxide, surface modifying agents, gelling agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

The drilling compositions, fracturing fluids, working fluids, or other treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the treatment fluids may be introduced in a dry or slurried state. In certain embodiments, the anchoring agent and/or other components of the treatment fluid may be metered directly into a base fluid to form a treatment fluid. In certain embodiments, the base fluid may be mixed with the fine particulates and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the formation for purposes of the present disclosure. In certain embodiments, the treatment fluid may be introduced into the fractures of a formation or into a closed wellbore system to be heated by the formation and extracted for geothermal energy production The present disclosure provides methods for using the treatment fluids to carry out hydraulic fracturing treatments. In certain embodiments, one or more treatment fluids (e.g., pad fluids, pre-pad fluids, other fluids) may be introduced into a formation, for example, through a wellbore that penetrates a formation. In these embodiments, one or more of the treatment fluids may be introduced at a pressure sufficient to create or enhance one or more fractures within the formation. The treatment fluid may also include one or more additives (gelling agents, weighting agents, and/or other optional additives) to alter properties of the treatment fluid. For example, the other additives may be included to reduce pumping friction, to reduce or eliminate the fluid's reaction to the geological formation in which the well is formed, to operate as surfactants, and/or to serve other functions.

In certain embodiments of the present disclosure, a drilling composition is provided. The drilling composition may be comprised of one or more of a base fluid, a resin, a thermally conductive filler, an oil-wetting surfactant, and a silane coupling agent. Non-limiting examples of a drilling composition used in certain embodiments of the present disclosure may comprise a drilling fluid and a first resin composition, the first resin composition comprising a polymerizable furfuryl acetate, an oil-wetting surfactant, a silane coupling agent, and a thermally conductive filler. Other non-limiting examples of a drilling composition used in certain embodiments of the present disclosure may comprise a drilling fluid and a second resin composition, the second resin composition comprising a furan-based resin, an oil-wetting surfactant, a silane coupling agent, a non-aqueous diluent, and a thermally conductive filler.

In some embodiments, surfactants may act to cause sandstone and carbonate (limestone) reservoirs to become oil-wet. Because the surfaces of sandstone formations are normally negatively charged, a cationic surfactant may be used to create an oil-wet condition within sandstone reservoirs. The list of cationic surfactants that may be suitable includes, but is not limited to the following: primary amines, secondary amines, tertiary amines, diamines, quaternary ammonium salts, di-quaternary salts, ethoxylated quaternary salts, ethoxylated amines, ethoxylated diamines, amine acetates, diamine diacetates, any derivatives thereof, and any combinations thereof. Similarly, because the surfaces of carbonate formations are normally positively charged, an anionic surfactant may be used to create an oil wet condition within carbonate reservoirs. The list of anionic surfactants that may be suitable includes, but is not limited to, the following: sulfonic acids and their salts, sulfates and ether sulfates, sulfonates, alpha-olefin sulfonates, ethoxylated carboxylates, sulfosuccinates, phosphate esters, alkyl naphthalene sulfonates, napthalene sulfonate condensate, any derivatives thereof, and any combinations thereof.

The silane coupling agent may comprise any silane coupling agent known in the art. Examples of silane coupling agents that may be suitable in certain embodiments include, but are not limited to, N-2-(aminoethyl)-3-aminopropyltrimethoxysilane, 3-glycidoxypropyltrimethoxysilane, n-beta-(aminoethyl)-gamma-aminopropyl trimethoxysilane, any derivatives thereof, and any combinations thereof.

In certain embodiments of the present disclosure, a resin may be provided. Resins that may be suitable for use in the present disclosure include all resins known in the art that are capable of forming a hardened, consolidated mass. Many such resins are commonly used in subterranean consolidation operations, and some suitable resins include two-component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins, generally require a time-delayed catalyst or an external catalyst to help activate the polymerization of the resins if the cure temperature is low (i.e., less than 250° F.), but will cure under the effect of time and temperature if the formation temperature is above about 250° F., or in some cases above about 300° F.

In some embodiments, the resin may include a resin composition with high thermal conductivity and/or a resin composition capable of withstanding high temperatures. Moreover, in some embodiments, the resin composition may undergo a polymerization reaction at high temperatures. In certain embodiments, furfuryl alcohol resins and furan-based resins may be used, which may be stable at temperatures exceeding about 500° F. Furthermore, some furfuryl alcohol resins and/or furan-based resins undergo a polymerization reaction at temperatures exceeding 275° F. In certain embodiments, the resin composition may provide consolidation strength for the wellbore, the formation, or the propped fractures therein. Moreover, the resin composition may enhance the efficiency of heat transfer between the formation and the fluid in order to transform the fluid into steam or supercritical fluid. In certain embodiments, the resin may be chemically catalyzed with delayed internal catalysts. Alternatively, the resin may be chemically catalyzed via an acid in a post-drilling operation. It is within the ability of one skilled in the art, with the benefit of this disclosure, to select a suitable resin composition for use in embodiments of the present disclosure and to determine whether a catalyst is required to trigger curing.

In certain embodiments of the present disclosure, a thermally conductive filler may be provided. The thermally conductive filler may comprise any thermally conductive filler known in the art. Examples of thermally conductive fillers that may be suitable in certain embodiments include, but are not limited to, carbon-based thermally conductive fillers, inorganic thermally conductive fillers, metal thermally conductive fillers, and hybrid thermally conductive fillers. Examples of carbon-based fillers include graphite, diamond, carbon nanotubes, graphene, carbon fibers, etc. Examples of inorganic fillers involve boron nitride, boron nitride nanosheets, aluminum nitride, silicon nitride, silicon carbide, alumina, etc. Examples of metal fillers include silver, copper, aluminum, nickel, etc. Fillers that have been functionalized are regarded as hybrid fillers, and those commonly used are fluorinated graphene, fluorinated carbon nanotubes, and other functionalized mixed fillers. Alternatively, a thermally conductive plurality of proppant particulates or a thermally conductive resin may act as a thermally conductive filler. It is within the ability of one skilled in the art, with the benefit of this disclosure, to select one or more suitable thermally conductive fillers for use in embodiments of the present disclosure.

In certain embodiments, a thermally conductive filler may be mixed with a resin, used to coat a proppant, or both, among other reasons, to enhance the thermal conductivity of a geothermal system. When mixed with a resin, a thermally conductive filler may comprise 0.001% to 50% of the resin by weight. When used to coat a proppant, a thermally conductive filler may comprise 0.01% to 75% of the proppant by weight. In certain embodiments, a thermally conductive filler may be included as one component of a treatment fluid.

In certain embodiments of the present disclosure, a proppant may be provided. Examples of proppant materials that may be suitable in certain embodiments include, but are not limited to, silica (sands), graded sands, Ottawa sands, Brady sands, Colorado sands; resin-coated sands; gravels; synthetic organic particles, nylon pellets, high density plastics, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other techniques for forming particles; or combinations thereof. It is within the ability of one skilled in the art, with the benefit of this disclosure, to select one or more suitable proppants for use in embodiments of the present disclosure. In some embodiments, the particle size of the proppant introduced into the formation is gradually increased from medium- to coarse-sized fracturing sand or other proppant. The gradual increase in particle size may facilitate placement of the particles in the dominant fracture and larger branches. In certain embodiments, the proppant may be mixed with a fracturing fluid to produce a proppant slurry.

The proppant may serve, among other purposes, to prop open fractures, thereby maintaining the integrity of a formation, allowing fluid to pass through the propped area, and/or conducting heat. After the proppant is introduced into the formation, the fracture may be allowed to close and hold the proppant in place between the fracture faces. In certain embodiments, some or all of the proppant may be pre-coated; in certain other embodiments, the proppant may not be pre-coated. In one or more embodiments, the proppant may be incorporated into a thermally conductive composition by coating the proppant with a thermally conductive resin composition. In one or more embodiments, the proppant itself may be thermally conductive.

Figure 1:
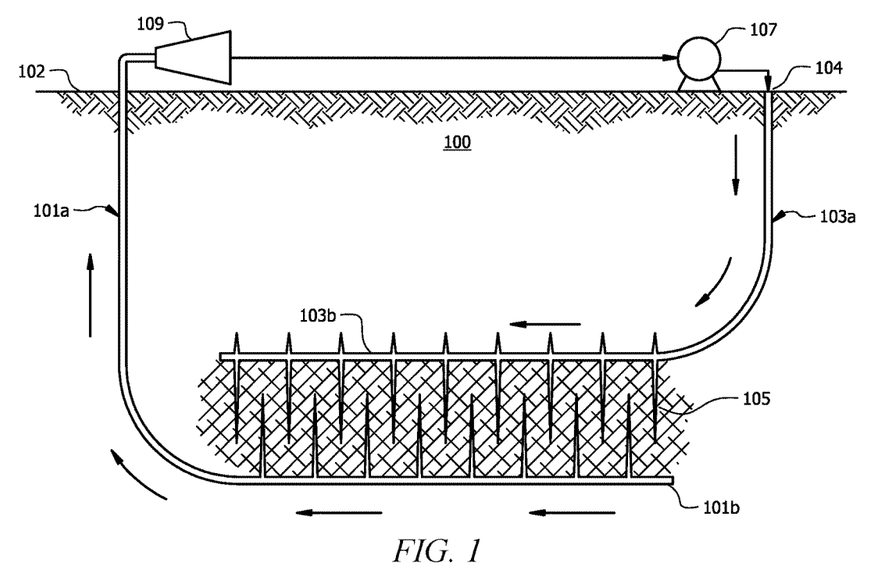
FIG. 1 is a schematic diagram illustrating a system of wellbores and propped fractures in a subterranean formation, in accordance with certain embodiments of the present disclosure.

Certain embodiments of the methods and compositions disclosed herein may directly or indirectly affect one or more components or pieces of equipment associated with the disclosed compositions. For example, FIG. 1 is a schematic diagram illustrating a system of wellbores and propped fractures in a subterranean formation, in accordance with certain embodiments of the present disclosure. The subterranean formation 100 includes a production wellbore 101 that has been drilled from the surface 102 to penetrate at least a portion of the formation 100. As shown, production wellbore 101 includes at least one substantially vertical portion 101a extending from location 102 at the surface and at least one substantially horizontal portion 101b that extends from the bottom of the vertical portion 101a. The production wellbore 101 may be coupled to an electricity generator 109, for example and without limitation, a turbine. The subterranean formation 100 also includes an injection wellbore 103 that has been drilled from a location 104 at the surface to penetrate at least a portion of the formation 100. As shown, injection wellbore 103 includes at least one substantially vertical portion 103a extending from the surface at location 104 and at least one substantially horizontal portion 103b that extends from the bottom of the vertical portion 103a. Further, the injection wellbore 103 may be coupled to an injection pump 107. In some embodiments, the horizontal portion 101b of the production wellbore 101 may be parallel to the horizontal portion 103b of the injection wellbore 103. In some embodiments, the horizontal portions 101b and 103b of the injection wellbore 103 may be within a range of 50 to 1000 feet of one another.

In certain embodiments, the fractures 105 may be created and/or propped via both the injection wellbore 103 and the production wellbore 101. In certain embodiments, the fractures 105 may be created in parallel to one another. In certain embodiments, the fractures may be created such that each primary fracture generated by one wellbore is located between, or in close proximity to, two primary fractures generated by the other wellbore.

In certain embodiments, a proppant slurry comprising a heat-activating resin may be used to create and/or prop one or more fractures 105. The formation may heat the resin, thereby activating a polymerization reaction within the resin. The polymerized resin may enhance one or more of wellbore-wall stabilization, formation-wall stabilization, and thermal conductivity. Further, the polymerized resin may transform the loose proppant into consolidated, permeable packs, which may hold the propped fractures open during fluid transport.

In certain embodiments, a fluid may be injected into an injection wellbore 103 and may travel to one or more propped fractures 105 to absorb heat in the rock formation. Subsequently, a high-temperature fluid may travel from the propped fractures 105 to a production wellbore 101 for production. In certain embodiments, the high-temperature fluid may then be used to generate electricity. For example and without limitation, the high-temperature fluid may be routed through one or more turbo-expanders, wherein the effluent fluids discharged from the turbo-expanders may pass through a heat exchanger and be recycled to the injection wellbore 103.

Figure 2:
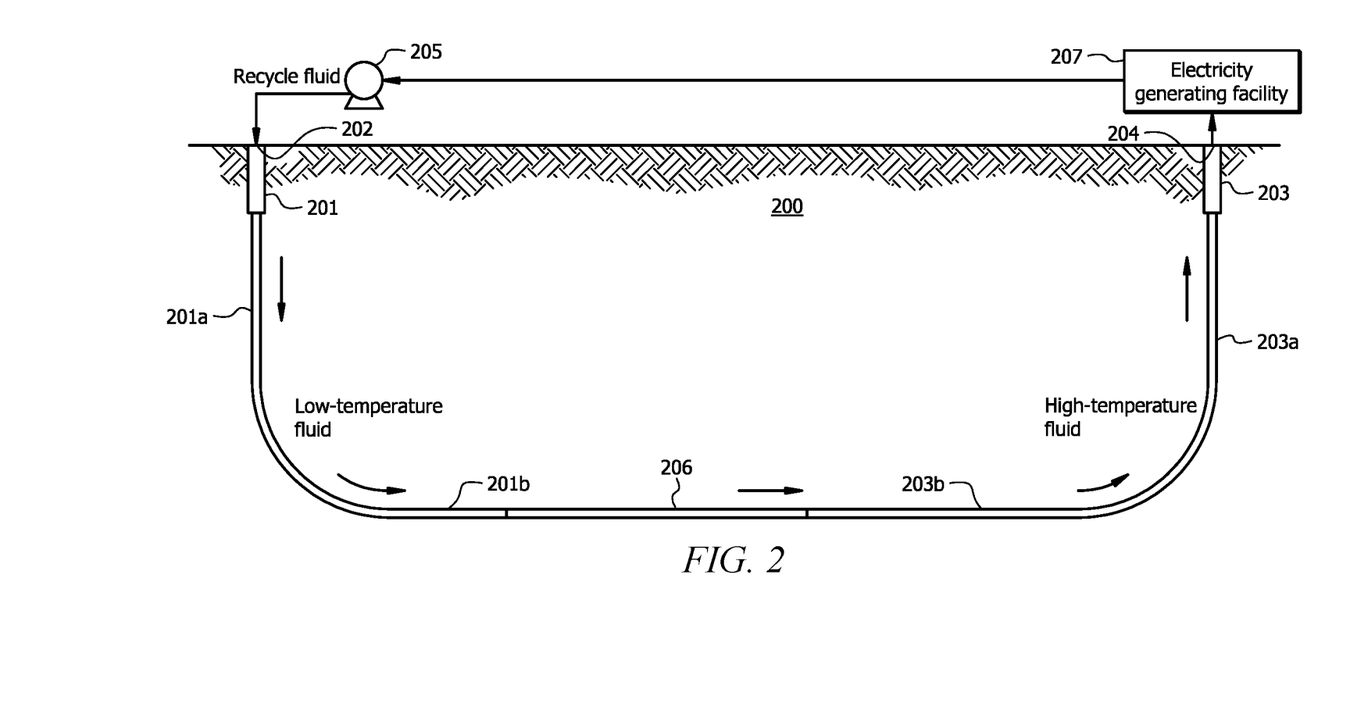
FIG. 2 is a schematic diagram illustrating an example of a closed loop wellbore system, in accordance with certain embodiments of the present disclosure.

FIG. 2 is a schematic diagram illustrating an example of a closed loop wellbore system, in accordance with certain embodiments of the present disclosure. The subterranean formation 200 includes a wellbore 201 that has been drilled from the surface 202 to penetrate at least a portion of the formation 200. As shown, the wellbore 201 includes an injection inlet 201e at or near the surface at location 202. Wellbore 201 includes at least one substantially vertical portion 201a extending from location 202 at the surface and at least one substantially horizontal portion 201b that extends from the bottom of the vertical portion 201a. Further, the injection inlet 201e may be coupled to an injection pump 205. The wellbore 201 also includes a production outlet 201f at or near the surface at location 204. As shown, the portion of wellbore 201 that connects to the production outlet 201f includes at least one substantially vertical portion 201g extending from the surface at location 204 and at least one substantially horizontal portion 201h that extends from the bottom of the vertical portion 201g. The production outlet 201f may be coupled to an electricity generator 207, for example and without limitation, a turbine. The horizontal portions 201b and 201h of the wellbore 201 connect at a location 206 to form a closed loop system.

In certain embodiments, a fluid may be injected into an injection inlet 201e of the closed-loop wellbore 201. The fluid may be heated as it passes through a region of the closed wellbore that is heated by a hot underground formation. The heated fluid may then be produced via a production outlet 201f. In certain embodiments, the heated fluid may be used to generate electricity. For example and without limitation, the heated fluid may be routed through one or more turbo-expanders, wherein the effluent fluids discharged from the turbo-expanders may pass through a heat exchanger and be recycled to the injection inlet 201e. In certain embodiments, the resin may be chemically catalyzed with delayed internal catalysts. Alternatively, the resin may be chemically catalyzed via an acid in a post-drilling operation.

In certain embodiments, a closed-loop wellbore (e.g., wellbore 201 shown in FIG. 2) may be drilled via a drilling composition comprising a drilling fluid and a resin composition. The resin composition may at least partially penetrate into the wellbore wall and/or seal off the formation from fluid loss through the wellbore. Further, as the resin composition is heated by the formation, the resin may undergo a polymerization reaction. The polymerized resin may, among other benefits, enhance one or more of wellbore-wall stabilization, formation-wall stabilization, and thermal conductivity.

Figure 3:
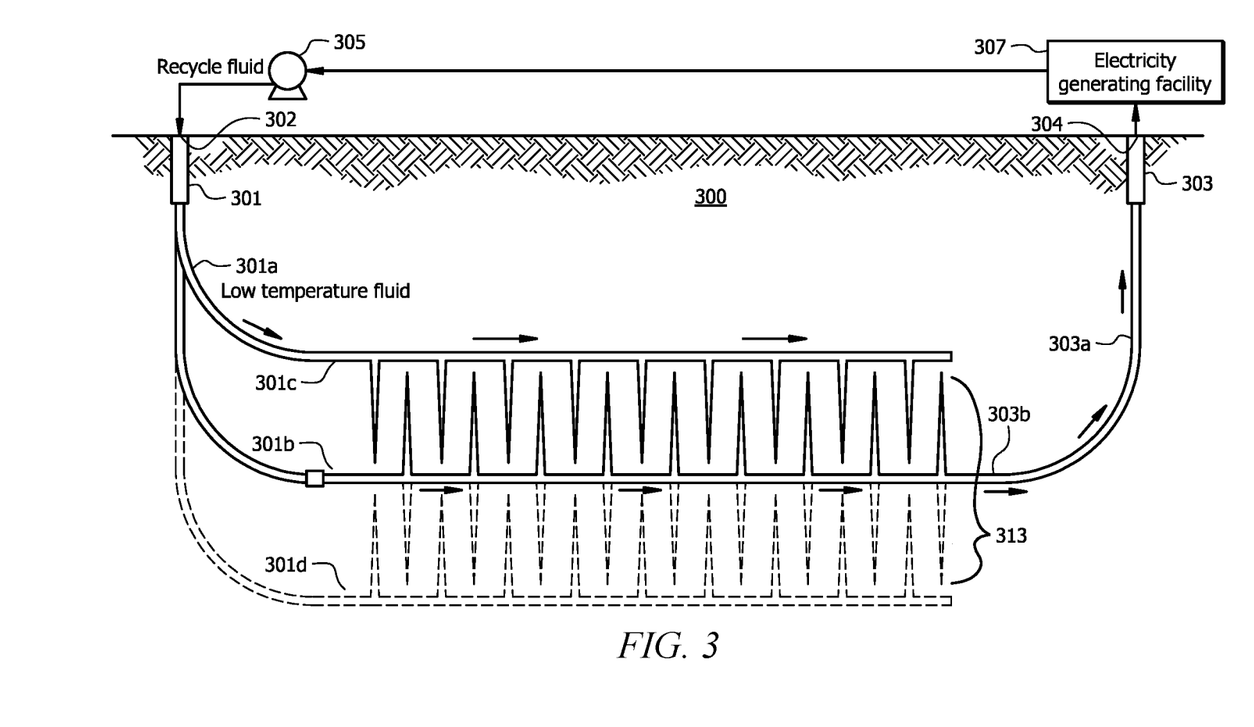
FIG. 3 is a schematic diagram illustrating an example of a closed loop wellbore system with propped fractures in a subterranean formation, in accordance with certain embodiments of the present disclosure.

FIG. 3 is a schematic diagram illustrating an example of a closed loop wellbore system along with propped fractures in a subterranean formation, in accordance with certain embodiments of the present disclosure. The subterranean formation 300 includes a wellbore 301 that has been drilled from the surface 302 to penetrate at least a portion of the formation 300. As shown, the wellbore 301 includes an injection inlet 301e at or near the surface at location 302. Wellbore 301 also includes at least one substantially vertical portion 301a extending from location 302 at the surface and at least one substantially horizontal portion 301b that extends from the bottom of the vertical portion 301a. Further, the injection inlet 301e may be coupled to an injection pump 305. The wellbore 301 also includes a production outlet 301f at or near the surface at location 304. As shown, the portion of wellbore 301 that connects to production outlet 301f includes at least one substantially vertical portion 301g extending from the surface at location 304 and at least one substantially horizontal portion 301h that extends from the bottom of the vertical portion 301g. The production outlet 301f may be coupled to an electricity generator 307, for example and without limitation, a turbine. In certain embodiments, the horizontal portions 301b and 301h of wellbore 301 may connect at location 306 to form a connected system. In certain embodiments, the wellbore 301 may include one or more additional horizontal portions 301c and 301d. In certain embodiments, one or more of the horizontal portions 301b, 301c, and 301d of the wellbore 301 may be parallel to one another. In certain embodiments, one or more of the horizontal portions 301b, 301c, and 301d of the wellbore 301 may be within a range of 50 feet to 1000 feet of one or more other horizontal portions 301b, 301c, or 301d of the wellbore 301.

In certain embodiments, the fractures 313 may be created and/or propped via one or more of the injection inlet 301e and the production outlet 301f. In certain embodiments, the fractures 313 may be created in parallel to one another. In certain embodiments, the fractures may be created such that each primary fracture generated by one horizontal portion 301b, 301c, or 301d of the wellbore 301 is located between, or in close proximity to, two primary fractures generated by another horizontal portion 301b, 301c, or 301d of the wellbore 301. FIG. 3 shows fractures 313 originating from only horizontal portions 301b, 301c, and 301d extending from vertical portion 201a of the wellbore 301, but those skilled in the art and with the benefit of this disclosure will understand that fractures 313 may originate from horizontal portions extending from one or more of vertical portions 301a or 301g of the wellbore 301.

In certain embodiments, one or more methods disclosed in connection with the systems of FIG. 1 and/or FIG. 2 may be used in tandem. In one or more embodiments, a fluid may be injected into an injection inlet 301e to enter one or more horizontal wellbores 301b, 301c, and 301d. The fluid may pass from one or more horizontal wellbores 301b, 301c, and 301d to one or more hot fractures 313; alternatively, the fluid may remain within a wellbore 301. After being heated within one or more of the fractures 313 or the horizontal wellbores 301b, 301c, and 301d, the heated fluid may be transferred to a production outlet 301f. In certain embodiments, the heated fluid may be used to generate electricity. For example and without limitation, the heated fluid may be routed through one or more turbo-expanders, wherein the effluent fluids discharged from the turbo-expanders may pass through a heat exchanger and be recycled to the injection inlet 301e.

The dotted lines 301d and 313 of FIG. 3 represent that, in certain embodiments, more than two horizontal wellbores 301b, 301c, and 301d may be drilled (including any accompanied fractures 313). In certain embodiments, a valve 320 may be installed to prevent backflow up the injection inlet 301e. For example and without limitation, the valve may be a swell packer, an external casing packer, a flapper-type check valve, a ball-and-seat type check valve, or a downhole ball-type valve. Similar valves optionally may be installed at other locations in the wellbores (not shown) to prevent backflow and/or otherwise control the flow of fluids in the system shown.

In certain embodiments, two wellbores may be drilled via a drilling composition comprising a drilling fluid and a resin composition. One wellbore may be used for injection, and the other wellbore may be used for production. The resin composition may penetrate into the walls of the wellbores and seal off the formation from fluid loss. Further, as the resin composition is heated by the formation, the resin may undergo a polymerization reaction. The polymerized resin may, among other benefits, enhance one or more of wellbore-wall stabilization, formation-wall stabilization, and thermal conductivity.

The methods and systems of FIGS. 1, 2, and 3 are useful to any process in which a heated fluid (including a heated vapor) may be used. For example and without limitation, the methods and systems of FIGS. 1, 2, and 3 may be used to produce heated fluid for energy production, evaporation, heat exchange, and/or to heat one or more nearby buildings. One or more of these processes may be performed on site or at an external location. Modifications to existing oil and gas wells may be performed to achieve any of the wellbore configurations described in this disclosure. For example and without limitation, in some embodiments, an existing vertical wellbore may be extended (for example and without limitation, by whipstocking) to form one or more horizontal boreholes; this process may be used to produce a well configuration similar to that of FIG. 3. In other embodiments, an existing horizontal wellbore may be extended to produce a well configuration similar to those of FIGS. 1 and 2.

An embodiment of the present disclosure is a method comprising: drilling with a drilling composition at least a portion of a first wellbore to penetrate at least a first portion of a subterranean formation from a surface, wherein the drilling composition comprises a base fluid, a resin, and a thermally conductive filler; introducing a fracturing fluid into the first wellbore at a first pressure sufficient to create at least a first set of fractures in the subterranean formation extending from and in fluid communication with the first wellbore; and introducing a first plurality of proppant particulates into at least the first set of fractures, wherein a second wellbore penetrates at least a second portion of the subterranean formation from the surface, and wherein a second set of fractures extends from and is in fluid communication with the second wellbore into the subterranean formation, and the first set of fractures is in fluid communication with the second set of fractures.

In certain embodiments discussed in the preceding paragraph, at least a portion of the second wellbore may be drilled with the drilling composition from the surface to penetrate at least the second portion of the subterranean formation; a fracturing fluid may be introduced into the second wellbore at a second pressure sufficient to create at least the second set of fractures in the subterranean formation; and a second plurality of proppant particulates may be introduced into at least the second set of fractures. In certain of the preceding embodiments, the working fluid may be injected having a first temperature into the first wellbore; the working fluid may be allowed to flow through the first wellbore and into the first set of fractures; the working fluid may be allowed to flow through the first set of fractures and into the second set of fractures; the working fluid may be allowed to flow through the second set of fractures and into the second wellbore; and the working fluid may be produced out of the second wellbore, wherein the produced working fluid has a second temperature that is higher than the first temperature. In certain of the preceding embodiments, the working fluid may be used at the second temperature to drive a turbo-expander for generating electricity. In certain of the preceding embodiments, the first set of fractures may comprise one or more primary fractures within 15 degrees of parallel with respect to one or more primary fractures of the second set of fractures. In certain of the preceding embodiments, each primary fracture of the first set of fractures may be located between at least two primary fractures of the second set of fractures. In certain of the preceding embodiments, each primary fracture of the first set of fractures may be located within ten feet of at least two primary fractures of the second set of fractures. In certain of the preceding embodiments, the first plurality of proppant particulates may be coated with one or more of the resin or the thermally conductive filler. In certain of the preceding embodiments, the resin may be one or more of a furfuryl alcohol resin or a furan-based resin. In certain of the preceding embodiments, the drilling composition may further comprise an oil-wetting surfactant and a silane coupling agent.

Another embodiment of the present disclosure is a method comprising: drilling with a drilling composition at least a portion of a wellbore from a surface to penetrate at least a portion of a subterranean formation, wherein the drilling composition comprises a base fluid, a resin, and a thermally conductive filler, and the wellbore comprises an injection inlet at a first location at or near the surface and a production outlet at a second location at or near the surface; and allowing the resin to penetrate into a wall of at least a portion of the wellbore.

In certain embodiments discussed in the preceding paragraph, a working fluid having a first temperature may be injected into the injection inlet; the working fluid may be allowed to flow from the injection inlet to the production outlet; and the working fluid may be produced out of the production outlet, wherein the produced working fluid may have a second temperature that is higher than the first temperature. In certain of the preceding embodiments, the resin may be one or more of a furfuryl alcohol resin or a furan-based resin. In certain embodiments, the drilling composition may further comprise an oil-wetting surfactant and a silane coupling agent Another embodiment of the present disclosure is a method comprising: drilling with a drilling composition at least a portion of a wellbore from a surface to penetrate at least a portion of a subterranean formation, wherein the drilling composition comprises a base fluid, a resin, and a thermally conductive filler, and the wellbore comprises: an injection inlet at a first location at or near the surface, a production outlet at a second location at or near the surface, a first portion of the wellbore, wherein a first set of fractures extends from the first portion of the wellbore into the subterranean formation; and a second portion of the wellbore, wherein a second set of fractures extends from the second portion of the wellbore into the subterranean formation; allowing the resin to penetrate into a wall of at least a portion of the wellbore; and introducing a plurality of proppant particulates into at least the second set of fractures, such that the first set of fractures is in fluid communication with the second set of fractures.

In certain embodiments discussed in the preceding paragraph, a working fluid having a first temperature may be injected into the injection inlet; the working fluid may be allowed to flow from the injection inlet to the production outlet; and the working fluid may be produced out of the production outlet, wherein the produced working fluid may have a second temperature that is higher than the first temperature. In certain of the preceding embodiments, the first set of fractures may comprise one or more primary fractures within 15 degrees of parallel with respect to one or more primary fractures of the second set of fractures. In certain of the preceding embodiments, each primary fracture of the first set of fractures may be located between at least two primary fractures of the second set of fractures. In certain of the preceding embodiments, each primary fracture of the first set of fractures may be located within ten feet of at least two primary fractures of the second set of fractures. In certain of the preceding embodiments, the drilling composition may further comprise an oil-wetting surfactant and a silane coupling agent.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. Furthermore, the words "comprising" (and any form of comprising, such as "comprise" and "comprises"), "having" (and any form of having, such as "has" and "have"), "including" (and any form of including, such as "includes" and "include") or "containing" (and any form of containing, such as "contains" and "contain") are to be understood as inclusive or open-ended and do not exclude additional, unrecited elements or method steps. The term "e.g." is to be understood as an abbreviation of the term "for example"; similarly, the term "i.e." is to be understood as an abbreviation of the term "that is." The term "some" is to be understood to mean "one or more"; the term "some" includes "all." The term "coupled" is to be understood to include any connection between two things, including and without limitation a physical connection (including and without limitation a wired connection), a non-physical connection (including and without limitation a wireless connection), or any combination thereof. The terms "fluid" and "fluids" are to be understood as including any form of liquid, gas, or supercritical fluid. The terms "fracturing fluid" and "fracturing fluids" are to be understood as subsets of the terms "treatment fluid" and "treatment fluids." The terms in the claims have their plain, ordinary meaning unless otherwise explicitly and clearly defined by the patentee.

What is claimed is:

1. A method comprising:
   drilling with a drilling composition at least a portion of a first wellbore to penetrate at least a first portion of a subterranean formation from a surface, wherein the drilling composition comprises a base fluid, a resin, and a thermally conductive filler;
   introducing a fracturing fluid into the first wellbore at a first pressure sufficient to create at least a first set of fractures in the subterranean formation extending from and in fluid communication with the first wellbore; and
   introducing a first plurality of proppant particulates into at least the first set of fractures, wherein the first plurality of proppant particulates are coated with the resin and the thermally conductive filler,
   wherein a second wellbore penetrates at least a second portion of the subterranean formation from the surface,
   wherein a second set of fractures extends from and is in fluid communication with the second wellbore into the subterranean formation, and the first set of fractures is in fluid communication with the second set of fractures, and
   wherein the first and second wellbores comprise a closed loop wellbore system configured for geothermal operations.

2. The method of claim 1, further comprising:
   drilling with the drilling composition at least a portion of the second wellbore from the surface to penetrate at least the second portion of the subterranean formation;
   introducing a fracturing fluid into the second wellbore at a second pressure sufficient to create at least the second set of fractures in the subterranean formation; and
   introducing a second plurality of proppant particulates into at least the second set of fractures, wherein the second plurality of proppant particulates are coated with the resin and the thermally conductive filler.

3. The method of claim 1, further comprising:
injecting a working fluid having a first temperature into the first wellbore;
allowing the working fluid to flow through the first wellbore and into the first set of fractures;
allowing the working fluid to flow through the first set of fractures and into the second set of fractures;
allowing the working fluid to flow through the second set of fractures and into the second wellbore; and
producing the working fluid out of the second wellbore, wherein the produced working fluid has a second temperature that is higher than the first temperature.

4. The method of claim 3, further comprising using the working fluid at the second temperature to drive a turbo-expander for generating electricity.

5. The method of claim 1, wherein the first set of fractures comprises one or more primary fractures within 15 degrees of parallel with respect to one or more primary fractures of the second set of fractures.

6. The method of claim 5, wherein each primary fracture of the first set of fractures is located between at least two primary fractures of the second set of fractures.

7. A method comprising:
drilling with a drilling composition at least a portion of a first wellbore to penetrate at least a first portion of a subterranean formation from a surface, wherein the drilling composition comprises a base fluid, a resin, and a thermally conductive filler;
introducing a fracturing fluid into the first wellbore at a first pressure sufficient to create at least a first set of fractures in the subterranean formation extending from and in fluid communication with the first wellbore; and
introducing a first plurality of proppant particulates into at least the first set of fractures,
wherein a second wellbore penetrates at least a second portion of the subterranean formation from the surface,
wherein a second set of fractures extends from and is in fluid communication with the second wellbore into the subterranean formation, and the first set of fractures is in fluid communication with the second set of fractures,
wherein the first set of fractures comprises one or more primary fractures within 15 degrees of parallel with respect to one or more primary fractures of the second set of fractures, and
wherein each primary fracture of the first set of fractures is located within ten feet of at least two primary fractures of the second set of fractures.

8. The method of claim 1, wherein the resin is one or more of a furfuryl alcohol resin or a furan-based resin.

9. The method of claim 1, wherein the drilling composition further comprises:
an oil-wetting surfactant; and
a silane coupling agent.

10. A method comprising:
drilling with a drilling composition at least a portion of a first wellbore to penetrate at least a first portion of a subterranean formation from a surface;
introducing a fracturing fluid into the first wellbore at a first pressure sufficient to create at least a first set of fractures in the subterranean formation extending from and in fluid communication with the first wellbore; and
introducing a first plurality of proppant particulates into at least the first set of fractures, wherein the first plurality of proppant particulates are coated with a resin and a thermally conductive filler,
wherein a second wellbore penetrates at least a second portion of the subterranean formation from the surface, and
wherein a second set of fractures extends from and is in fluid communication with the second wellbore into the subterranean formation, and the first set of fractures is in fluid communication with the second set of fractures, and
wherein the first and second wellbores comprise a closed loop wellbore system configured for geothermal operations.

11. The method of claim 10, further comprising:
drilling with the drilling composition at least a portion of the second wellbore from the surface to penetrate at least the second portion of the subterranean formation;
introducing a fracturing fluid into the second wellbore at a second pressure sufficient to create at least the second set of fractures in the subterranean formation; and
introducing a second plurality of proppant particulates into at least the second set of fractures, wherein the second plurality of proppant particulates are coated with the resin and the thermally conductive filler.

12. The method of claim 10, further comprising:
injecting a working fluid having a first temperature into the first wellbore;
allowing the working fluid to flow through the first wellbore and into the first set of fractures;
allowing the working fluid to flow through the first set of fractures and into the second set of fractures;
allowing the working fluid to flow through the second set of fractures and into the second wellbore; and
producing the working fluid out of the second wellbore, wherein the produced working fluid has a second temperature that is higher than the first temperature.

13. The method of claim 12, further comprising using the working fluid at the second temperature to drive a turbo-expander for generating electricity.

14. The method of claim 10, wherein the first set of fractures comprises one or more primary fractures within 15 degrees of parallel with respect to one or more primary fractures of the second set of fractures.

15. The method of claim 14, wherein each primary fracture of the first set of fractures is located between at least two primary fractures of the second set of fractures.

16. The method of claim 14, wherein each primary fracture of the first set of fractures is located within ten feet of at least two primary fractures of the second set of fractures.

17. The method of claim 10, wherein the resin is one or more of a furfuryl alcohol resin or a furan-based resin.

18. The method of claim 10, wherein the drilling composition further comprises:
an oil-wetting surfactant; and
a silane coupling agent.

19. The method of claim 2, further comprising:
injecting a working fluid having a first temperature into the first wellbore;
allowing the working fluid to flow through the first wellbore and into the first set of fractures;
allowing the working fluid to flow through the first set of fractures and into the second set of fractures;
allowing the working fluid to flow through the second set of fractures and into the second wellbore;
producing the working fluid out of the second wellbore, wherein the produced working fluid has a second temperature that is higher than the first temperature; and using the working fluid at the second temperature to drive a turbo-expander for generating electricity.

20. The method of claim 11, further comprising:
injecting a working fluid having a first temperature into the first wellbore;
allowing the working fluid to flow through the first wellbore and into the first set of fractures;
allowing the working fluid to flow through the first set of fractures and into the second set of fractures;
allowing the working fluid to flow through the second set of fractures and into the second wellbore;
producing the working fluid out of the second wellbore, wherein the produced working fluid has a second temperature that is higher than the first temperature; and
using the working fluid at the second temperature to drive a turbo-expander for generating electricity.

* * * * *